US011170384B2

United States Patent
Yeung

(10) Patent No.: US 11,170,384 B2
(45) Date of Patent: Nov. 9, 2021

(54) RETURN FRAUD PREVENTION

(71) Applicant: Toshiba Global Commerce Solutions Holdings Corporation, Tokyo (JP)

(72) Inventor: Mike Yeung, Mission Viejo, CA (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 16/370,305

(22) Filed: Mar. 29, 2019

(65) Prior Publication Data

US 2020/0311742 A1    Oct. 1, 2020

(51) Int. Cl.
| | |
|---|---|
| *G06Q 30/00* | (2012.01) |
| *G06F 16/22* | (2019.01) |
| *G06K 7/10* | (2006.01) |
| *G06Q 20/40* | (2012.01) |
| *G06Q 20/20* | (2012.01) |

(52) U.S. Cl.
CPC ......... *G06Q 30/0185* (2013.01); *G06F 16/22* (2019.01); *G06K 7/10297* (2013.01); *G06Q 20/208* (2013.01); *G06Q 20/407* (2013.01); *G06K 2007/10504* (2013.01)

(58) Field of Classification Search
CPC ............. G06Q 30/0185; G06Q 20/407; G06Q 20/208; G06F 16/22; G06K 7/10297; G06K 2007/10504
See application file for complete search history.

(56) References Cited

U.S. PATENT DOCUMENTS

| | | | | |
|---|---|---|---|---|
| 5,874,896 A | * | 2/1999 | Lowe | G07G 1/0054 340/13.26 |
| 6,016,480 A | * | 1/2000 | Houvener | G07F 7/1008 705/21 |
| 7,108,183 B1 | * | 9/2006 | Cox, Jr. | G06K 1/126 235/385 |
| 7,311,253 B2 | | 12/2007 | Garner | |
| 7,379,899 B1 | * | 5/2008 | Junger | G06Q 20/203 235/385 |
| 7,455,226 B1 | * | 11/2008 | Hammond | G06Q 10/087 235/385 |

(Continued)

FOREIGN PATENT DOCUMENTS

| | | |
|---|---|---|
| WO | 2016058027 | 4/2016 |
| WO | 2018099588 | 6/2018 |

OTHER PUBLICATIONS

Dholakia, Swarit. "How 15-cent stickers can save Walmart over $125 million", <https://medium.com/@swaritd/how-15-cent-stickers-can-save-walmart-over-125-million-551450673a2>. Dec. 2018. (Year: 2018).*

(Continued)

*Primary Examiner* — Nathan A Mitchell
(74) *Attorney, Agent, or Firm* — Patterson + Sheridan, LLP

(57) ABSTRACT

A point of sale (POS) system that prevents return fraud is described. The POS system detects radio-frequency identification (RFID) tags associated with an item at a time of purchase and when the item is returned. If there is no discrepancy between the detected RFID tags, then the item can be quickly returned without further inspections. If there is a discrepancy, a quick identification of missing parts and the return condition is determined based on missing RFID tags.

20 Claims, 6 Drawing Sheets

(56) References Cited

U.S. PATENT DOCUMENTS

| | | | |
|---|---|---|---|
| 7,605,705 B2* | 10/2009 | Kritt | G06Q 10/087 340/568.6 |
| 7,840,439 B2* | 11/2010 | Junger | G06Q 20/201 705/23 |
| 7,920,063 B2* | 4/2011 | Ulrich | G08B 13/2417 340/572.1 |
| 8,510,171 B2 | 8/2013 | Pederson et al. | |
| 8,810,399 B2 | 8/2014 | Forster | |
| 9,137,500 B1 | 9/2015 | Wachman et al. | |
| 9,466,233 B2 | 10/2016 | Weightman et al. | |
| 9,697,711 B2 | 7/2017 | McIntosh | |
| 10,296,916 B2* | 5/2019 | Maraz | G06Q 20/202 |
| 2002/0143668 A1 | 10/2002 | Goodwin | |
| 2004/0088230 A1* | 5/2004 | Elliott | G06Q 30/02 705/28 |
| 2004/0088231 A1* | 5/2004 | Davis, Jr. | G06F 16/21 705/28 |
| 2004/0143505 A1* | 7/2004 | Kovach | G06Q 20/208 705/23 |
| 2005/0131763 A1* | 6/2005 | Junger | G06Q 20/20 705/23 |
| 2006/0074759 A1* | 4/2006 | Claudatos | G07G 1/0045 705/22 |
| 2007/0094087 A1* | 4/2007 | Mitchell | G06Q 40/02 705/22 |
| 2008/0079540 A1* | 4/2008 | Aull | H04B 5/02 340/10.1 |
| 2008/0088450 A1* | 4/2008 | Kwan | G07G 3/003 340/572.1 |
| 2008/0165008 A1* | 7/2008 | Mercier | G08B 13/2445 340/572.1 |
| 2009/0045955 A1* | 2/2009 | Ulrich | G07G 1/009 340/572.1 |
| 2010/0235250 A1* | 9/2010 | Bar-Levav | G06Q 20/20 705/23 |
| 2011/0087606 A1* | 4/2011 | Hammond | G06Q 10/06 705/304 |
| 2011/0119142 A1* | 5/2011 | Maraz | G07F 9/002 705/21 |
| 2012/0078739 A1* | 3/2012 | Maraz | G06Q 20/28 705/21 |
| 2012/0160914 A1* | 6/2012 | Fratti | G06K 19/07758 235/381 |
| 2012/0280040 A1* | 11/2012 | Carney | G07G 5/00 235/383 |
| 2013/0046659 A1* | 2/2013 | Junger | G06Q 20/201 705/28 |
| 2013/0133381 A1 | 5/2013 | Will | |
| 2013/0238471 A1* | 9/2013 | Maraz | G06Q 10/087 705/28 |
| 2015/0356845 A1* | 12/2015 | Forster | H01Q 1/2225 340/572.1 |
| 2017/0124919 A1 | 5/2017 | Karan | |
| 2017/0287297 A1* | 10/2017 | Hardie-Bick | G06Q 20/3278 |
| 2018/0082252 A1* | 3/2018 | Wilkinson | G06Q 10/0837 |
| 2018/0096331 A1* | 4/2018 | Patil | G07G 1/009 |
| 2018/0341942 A1* | 11/2018 | DeBates | G06Q 20/4014 |
| 2019/0026615 A1* | 1/2019 | Lewis | G06K 1/121 |

OTHER PUBLICATIONS

"RFID for Loss Prevention". Sensormatic white paper. Retrieved from <https://www.sensormatic.com/-/media/project/sensormatic/resources/whitepapers/files/r1906001_rfid-for-lp-planning-guide---update.ashx>. 2019 (Year: 2019).*

Chappell et al., "Auto-ID in the box: the value of Auto-ID technology In retail stores," Published Feb. 1, 2003, 27 pages.

Mark Roberti, "RFID Could Reduce Return Fraud—a $14 Billion Problem," RFID Journal Blog, Nov. 9, 2010, 2 pages.

David Martinez, "Rewriting the Odds," May 4, 2016, Robins Kaplan Trial Attorneys Blog, 3 pages.

* cited by examiner

RETURN FRAUD PREVENTION

BACKGROUND

The present disclosure relates to the prevention of return fraud during transactions, and more specifically, to utilizing radio frequency identification tags to determine if all the components of an item being returned are present at the time of return. Retailers and others provide generous return policies, which can lead to return fraud when someone returning the item has removed valuable pieces of the item before return. Current methods to prevent return fraud rely on manual and visual inspection of every item to ensure that the item is in condition for return. These methods use time and resources that could otherwise be focused on profit producing tasks at a retailer.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method at a point of sale (POS) system. The method includes: reading, using an antenna associated with the POS system, first information from a plurality of initial radio-frequency identification (RFID) tags associated with one or more components an item; storing the first information as an item tag inventory for the item in an item tag inventory database; and at a time of item return, reading, using the antenna associated with the POS system, second information from one or more return RFID tags associated with the item. The method also includes storing the second information as a return RFID set; determining a return condition output for the item based on a comparison of the return RFID set and the stored item tag inventory; and outputting the return condition output to a POS system output device. Other embodiments of this aspect include corresponding computer systems, apparatus, and computer programs recorded on one or more computer storage devices, each configured to perform the actions of the methods.

In one embodiment, a point of sale (POS) system is provided. The system including: one or more computer processors. The POS system also includes an antenna configured to detect radio-frequency identification (RFID) tags; and a memory containing program code which, when executed by the one or more computer processors, performs an operation. The operation includes: reading an item, using the antenna associated with the POS system, first information from a plurality of initial radio-frequency identification (RFID) tags associated with one or more components; storing the first information as an item tag inventory for the item in an item tag inventory database; and at a time of item return, reading, using the antenna, second information from one or more return RFID tags associated with the item. The operation also includes storing the second information as a return RFID set; determining a return condition output for the item based on a comparison of the return RFID set and the stored item tag inventory; and outputting the return condition output to a POS system output device.

In another embodiment, a computer program product for a point of sale (POS) system is provided. The computer program product including: a computer-readable storage medium having computer-readable program code embodied therewith, the computer-readable program code executable by one or more computer processors to perform an operation. The operation includes: reading, using an antenna associated with the POS system, first information from a plurality of initial radio-frequency identification (RFID) tags associated with one or more components an item; storing the first information as an item tag inventory for the item in an item tag inventory database; and at a time of item return, reading, using the antenna associated with the POS system, second information from one or more return RFID tags associated with the item. The operation also includes storing the second information as a return RFID set; determining a return condition output for the item based on a comparison of the return RFID set and the stored item tag inventory; and outputting the return condition output to a POS system output device.

Figure 1:
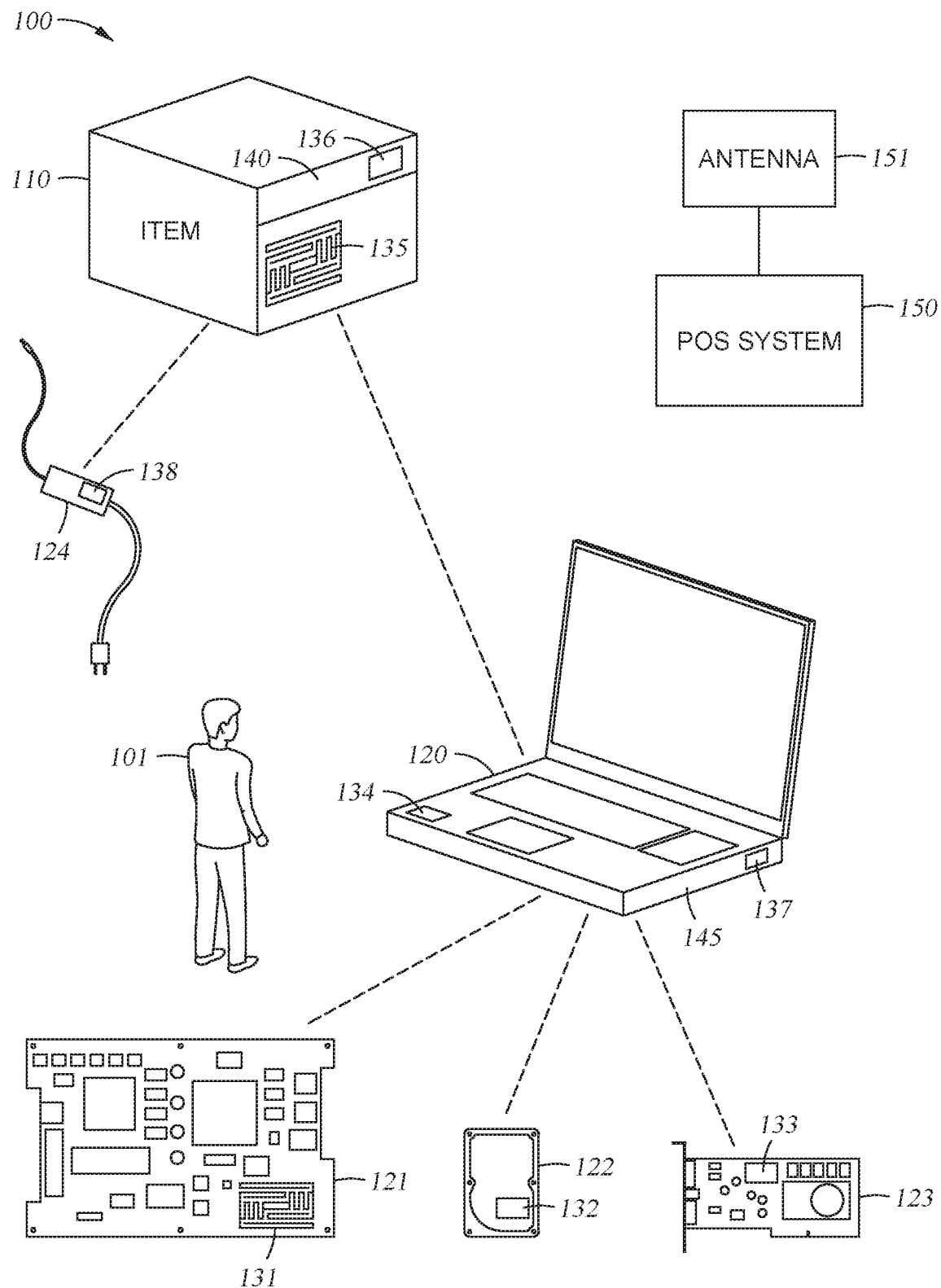
FIG. 1 illustrates an exemplary point of sale (POS) system and item for return, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Aspects of the current disclosure relate to the prevention of return fraud for items that contain multiple components. For example in a retail environment, a customer may purchase an item, and sometime after the time of purchase, return the item for exchange or refund. In most cases, the customer is returning the item for a myriad of reasons including the product not meeting the customer's needs or that the customer desires a different product, etc. In order to provide high levels of customer service, retailers often have generous return policies and are willing to accept opened and used items for return to match customer expectations. In some cases, these generous return policies can lead to return fraud in which a customer is returning an item that has had critical parts removed or returning an altogether different item. For example, valuable items and components may be within containers such as item/product packaging and/or within the product itself. A customer attempting return fraud may remove valuable components or substitute different components within the packaging such that he or she can both profit from the return of item and from the removed valuable components.

Retailers and others have attempted manual methods for reducing return fraud by having employees physically and visually inspect every returned item to ensure that the item and the associated components of the item are present at return. Additionally, complicated tracking systems using customer identification, such as drivers licenses numbers, etc. are used to track returned items and a customer's tendency to return the items. These methods only increase the time and resources used by a retailer to process returned items while also inconveniencing a customer who has to wait for the returned item to be inspected. Moreover, even physical and visual inspection of a returned item by a retail employee may fail to identify if there are critical and valuable missing pieces/components in the item, which can amplify the waste of resources used in returning the item and in the loss of product in a fraudulently returned item.

The systems and methods described herein provide for a point of sale (POS) system that prevents return fraud by detecting a first set of radio-frequency identification (RFID) tags associated with an item at a time of purchase and comparing the first set of RFID tags to a set of detected RFID tags when the item is returned. If there is little to no discrepancy between the first set of RFID tags and the return set of RFID tags, then the item can be quickly returned without further inspections. If there is a discrepancy, a quick identification of missing parts and the return condition can be determined based on the missing RFID tags. The examples and embodiments described herein primarily relate to a retail environment, but may also be used in any environment where an item is returned including a rental environment, automotive service environment, etc.

FIG. 1 illustrates an exemplary point of sale (POS) system and item for return, according to one embodiment. As shown, the environment 100 includes an item 120, an item receiver 101 (e.g., a customer), and a POS system 150. In this example, the item 120 (a laptop) may be packaged in an item container 110 along with an accessory 124 (a power cable). The item container 110, the item 120 and the item accessory 124 each have respective RFID tags 135, 134 and 138 affixed thereto. At a time of purchase of the item 120 by the item receiver 101, the POS system 150 detects a plurality of tamper proof RFID tags associated with the item (e.g., RFID tags 134, 135 and 138) using the associated antenna 151. In some examples, the antenna 151 is a two-way transmitter-receiver configured to interrogate RFID tags and receive responses from the interrogated tags. In some examples, the tamper proof RFID tags are passive RFID tags that no longer provide a signal in response to a transmission/interrogation from an antenna after the RFID tag is manipulated (e.g., removed and/or changed in anyway). In some examples, the detection of RFID tags 134, 135 and 138 occurs during the normal process of a purchase transaction and does not cause additional delays in purchasing the item. For example, while a barcode (not shown) of item container 110 is being scanned and processed by the POS system 150, the RFID tags associated with the item 120 are detected by the antenna 151 and tracking of the RFID tags by the POS system 150 begins by storing information associated with the item itself, such a unique identification of the item, item container, etc. and the detected/read RFID tags associated with the item.

In some examples, the item receiver 101 attempting return fraud may remove one or more of the item/components and attempt to return the item container 110 for a refund/exchange. The POS system 150 can determine whether the item 120 and the item accessory 124 are within the container without opening the item container 110 by detecting the presence of the RFID tags 134 and 138 as described in further detail in relation to FIGS. 3-5.

In some examples, the item 120, embodied as a laptop computer, has several high value components within the laptop itself, including the component 121 (e.g., a CPU), component 122 (e.g., a memory drive), and a component 123 (e.g., a video card). The components 121, 122, and 123 all represent valuable internal components that can be removed from the item 120, without a noticeable change in the physical characteristics of the item, such as the appearance, the weight of the item, etc. Without the RFID tags attached to each of the item/components, the only way to verify that the item 120 is in condition for return is to visually inspect the item to determine if components have been removed. Provisioning the item/components with RFID tags provides an effective means of reducing the risk of return fraud as described in greater detail herein, in relation to FIGS. 3-5.

In some examples, the valuable components of the item 120 are not positioned within the item for easy RFID tag readings. For example, when the item 120 includes electromagnetic blocking materials, the components 121-123 may be positioned within the item such that interrogating radio waves from the antenna 151 are not able to reach the components. Thus, in some examples, the item 120 has a RFID tag 137, such as a printable RFID tag applied to a seam 145 of the item, such as along an access port to the valuable internal components within the item. If the RFID tag 137 is not detected upon return of the item 120, this may indicate that the seam 145 has been opened and the RFID tag 137 has been damaged such that it is not responding to interrogation signals. In this example, the item 120 may need further inspection before return can be completed. Similarly, the RFID tag 136 is applied to a seam 140 of the item container 110. In an example where the item container 110 is unopened, the RFID tag 136, and other tags applied to other seams of the item container 110, are still detectable by the antenna 151 and the POS system 150. The functions and components of the POS system 150 are described in further detail in relation to FIGS. 2-5 below.

Figure 2:
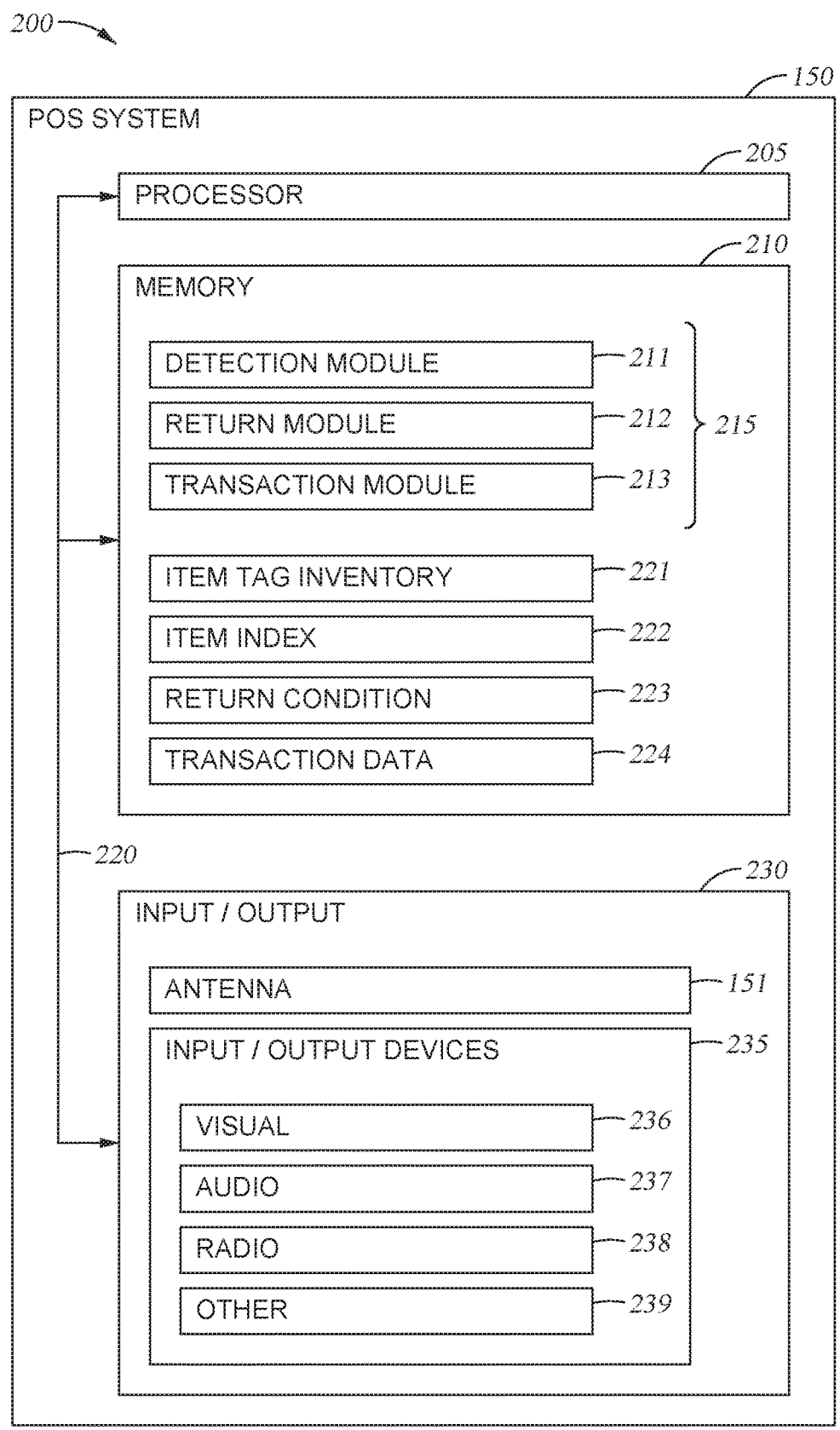
FIG. 2 illustrates a block flow diagram of an exemplary POS system for return fraud prevention, according to one embodiment.

FIG. 2 illustrates an exemplary POS system for return fraud prevention, according to one embodiment. Specifically, the FIG. 2 illustrates the POS system 150, which includes a number of processors 205, memory 210, and input/output 230, which are interconnected using one or more connections 220. In one embodiment, the POS system 150 may be implemented as a singular computing device and connection 220 may represent a common bus. In other embodiments, POS system 150 is distributed and includes a plurality of discrete computing devices that are connected through wired or wireless networking. The processors 205 may include any processing element suitable for performing functions described herein, and may include single or multiple core processors, as well as combinations thereof. Processors 205 may be included in a single computing device, or may represent an aggregation of processing elements included across a number of networked devices such as multiple POS systems 150, etc.

Memory 210 may include a variety of computer-readable media selected for their size, relative performance, or other capabilities: volatile and/or non-volatile media, removable and/or non-removable media, etc. Memory 210 may include cache, random access memory (RAM), storage, etc. Storage included as part of memory 210 may typically provide a non-volatile memory for the networked computing devices, and may include one or more different storage elements such as Flash memory, a hard disk drive, a solid state drive, an optical storage device, and/or a magnetic storage device. Memory 210 may be included in a single computing device or may represent an aggregation of memory included in networked devices. Memory 210 may include a plurality of modules 215 for performing various functions described herein. The modules 215 generally include program code that is executable by one or more of the processors 205.

As shown, modules 215 include detection module 211, return module 212, and transaction module 213. The modules 215 may also interact to perform certain functions. For example, return module 212 during operation may make calls to the transaction module 213, and so forth. The person of ordinary skill will recognize that the modules provided here are merely non-exclusive examples; different functions and/or groupings of functions may be included as desired to suitably operate the environment. Memory 210 may also include item tag inventory database 221, item index 222, return condition database 223, and transaction database 224. In one embodiment, item tag inventory database 221, item index 222, return condition database 223, and transaction database 224 are stored on the POS system 150 or on a separate database accessible to the POS system 150. In some examples, the item tag inventory database 221 includes the detected/read information from RFID tags at a time of item purchase and the item index 222 includes information that relates to the item including information such expected RFID tags, item price, item type, and other information. In some examples, the return condition database 223 and the transaction database 224 include information related to specific items and the transaction records. In some examples, the transaction database 224 is used to track specific item using identification information and to correlate the specific item to an item tag inventory stored in the item tag inventory database 221.

Input/output (I/O) 230 includes the antenna 151, shown in FIG. 1. I/O 230 may further include input/output devices (not illustrated) 235 that may be included to enhance the experience for persons interacting with the POS system 150. In some embodiments, the POS system 150 includes input/output devices 235, such as visual devices 236 (e.g., visual displays, indicators), audio devices 237 (e.g., speakers) and/or radio devices 238 for communicating with persons during their transactions. The input/output devices 235 may also include other devices 239 that provide information to people through tactile feedback (e.g., haptic devices) or using other sensory stimuli. The input/output devices may also include suitable devices capable of receiving input from persons, such as cameras, keyboards or keypads, touchscreens, buttons, inertial sensors, etc. I/O 230 may further include wired or wireless connections to an external network using I/O adapter circuitry. As described above, the elements of the POS system 150 interact to perform the functions of the POS system 150 as described in greater detail in relation to FIGS. 3-5 herein.

Figure 3:
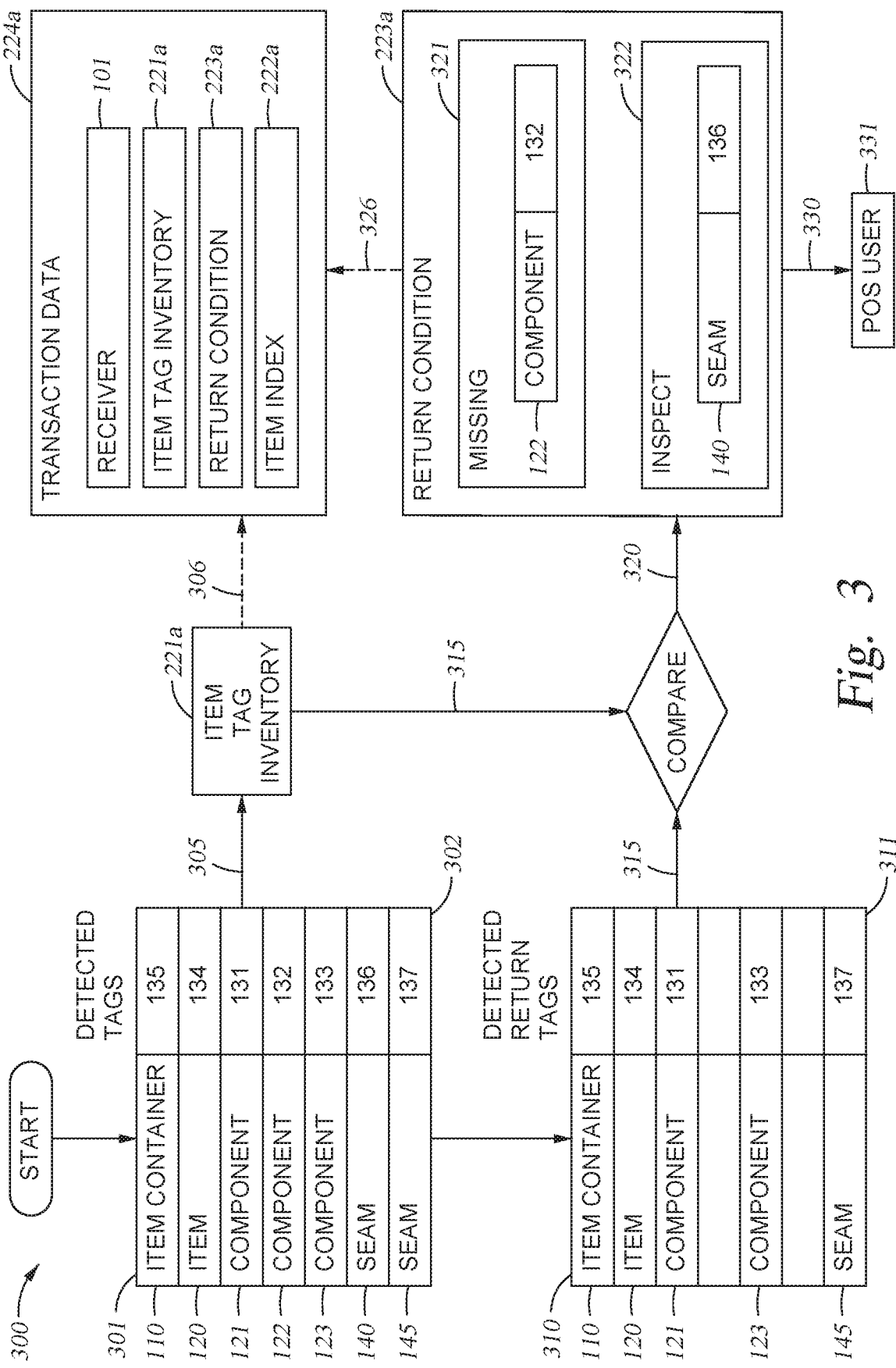
FIG. 3 is a block flow diagram illustrating operation of a POS system to prevent return fraud, according to one embodiment.

FIG. 3 is a block flow diagram illustrating operation of a POS system (e.g., the POS system 150) to prevent return fraud, according to one embodiment. The operation 300 shown in FIG. 3 begins at step 301, where the POS system 150, at a time of item purchase, reads/detects a plurality of RFID tags associated with one or more components of the item as the initial detected tag set 302. The detected tags include all of the detected tags shown in FIG. 1 and represent a complete item available for purchase including the various components, the item, and the item container. In some examples, the initial detected tag set 302 is compared to the item index 222 to ensure that the item includes all of the expected RFID tags. For example, for an unopened laptop, the item index 222 indicates that the RFID tags 131-138 are expected at the time of purchase. In some examples, the detected RFID tags and the item index are used to identify the item along with other information such as a purchase price for the item, etc. along with or lieu of a barcode identification.

Once read/detected, at step 305, the POS system 150 stores the information related to the detected tag set 302 (e.g., tag identifications etc.) as the item tag inventory 221*a* in the item tag inventory database 221. In some examples, the item tag inventory 221*a* includes a unique identifier for each specific item, such that each item can be identified in the item tag inventory database 221 at a time of return. In some examples, the operation 300 may also include step 306, where the item tag inventory 221*a* is stored in/with transaction data 224*a* in the transaction database 224, along with other information related to the item such as the item index information, item index 222*a*, and an identification of the item receiver, receiver 101. The transaction data 224*a* can be used by the POS system 150 provider/operator to identify additional information about the item transaction in addition to the RFID tags.

At a time of item return, the operation 300 proceeds to step 310, where the POS system 150 reads/detects one or more return RFID tags, where information related to the return RFID tags collectively define a detected return tag set 311. At step 315, the POS system 150 compares the detected return tag set 311 to the item tag inventory 221*a* and at step 320 uses the comparison to determine a return condition for the item. In some examples, if the item tag inventory 221*a* is unavailable for the detected return tag set, a comparison with an item specific index in the item index database 222 can be executed to ensure that the return item includes all of the expected RFID tags.

For purposes of illustration, assume that RFID tags 132 and 136 (associated with component 122 and seam 140, respectively) do not respond with a signal upon interrogation. Consequently, the detected return tag set 311 shown in FIG. 3 does not include the RFID tags 132 and 136. In some examples, the POS system 150 determines that the component 122 and the seam 140 are missing and thus the return condition 223*a* is marked or flagged as not ready for return and the missing components are flagged for follow-up by the POS system 150 user.

In some examples, the POS system 150, using the item index 222*a* and other information, determines that some of the RFID tags are not critical for return. For example, a missing or undetected RFID tag 136 simply indicates that the item container 110 was opened. Further the item container 110 and/or other components such as the item accessory 124 may not be needed for return so the RFID tags 135 and 138 are not critical. In contrast, the RFID tags directly associated with the item 120 and its internal components are critical. For example, the missing RFID tag 132 may indicate that the component 122 is missing from the item 120 at the time of return and should be flagged as unreturnable or flagged for follow-up by a POS user (e.g., the return retail employee).

Using the information described above, the POS system 150 determines the return condition 223*a*. In some examples, the return condition simply indicates that the item is available for return. In other examples, such as shown in FIG. 3, the return condition 223a includes outputs 321 and 322 which indicate that some items are missing (e.g., component 122 associated with the RFID tag 132) and/or some items should be inspected by the POS user (seam 140 associated with the RFID tag 136). The outputs 321 and 322 may include visual and/or outputs, such as text, pictures, and/or audio readouts identifying the missing part. At step 330, the return condition, including any outputs are provided to the POS user 331, through the input/output devices 235. In some examples, the operation includes step 326 where the return condition is stored in the transaction data 224a such that the entire transaction from purchase to return is tracked by the POS system 150.

Figure 4A:
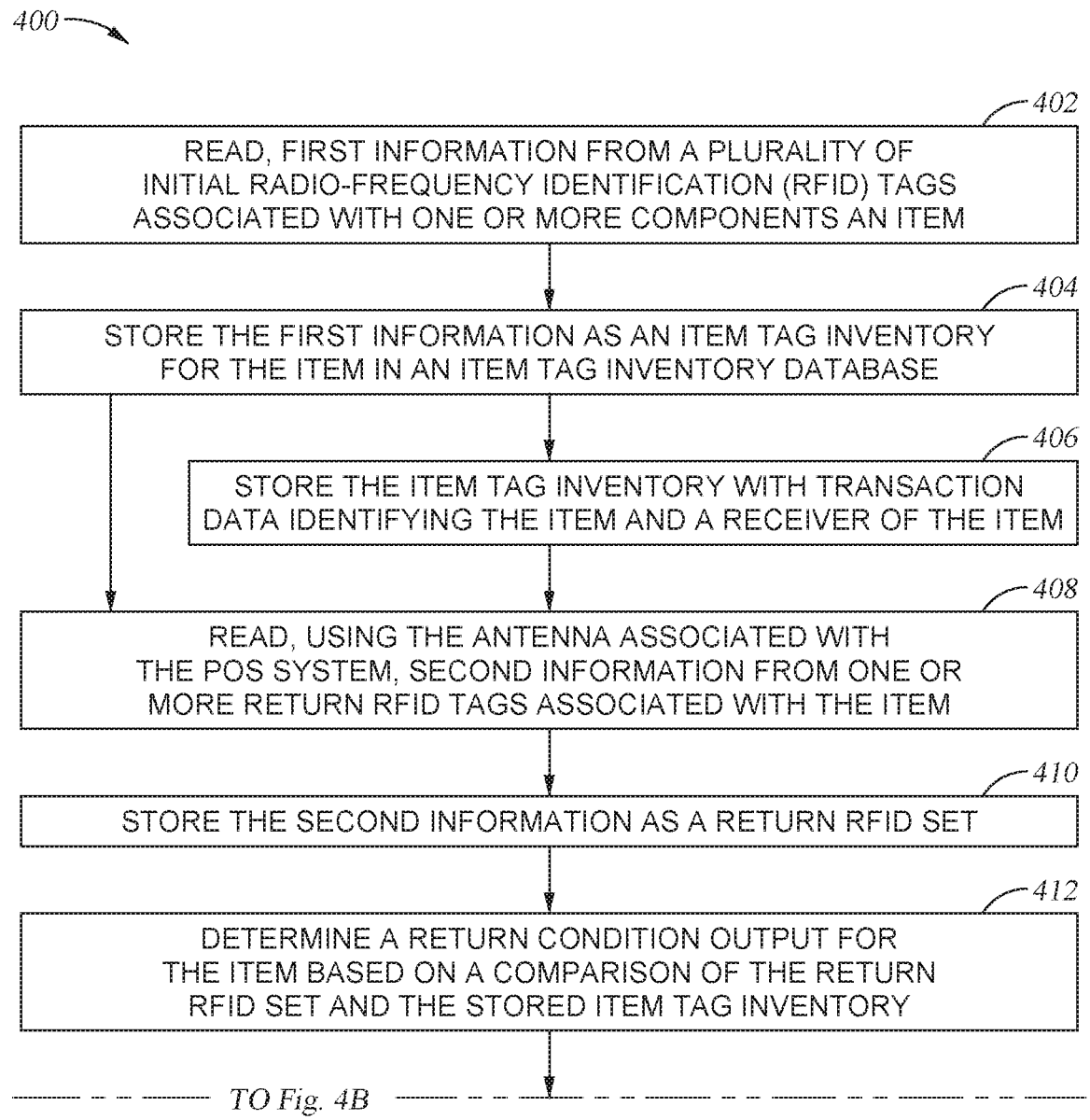
FIGS. 4A-B illustrate block flow diagrams of a method for return fraud prevention, according to one embodiment.
Figure 4B:
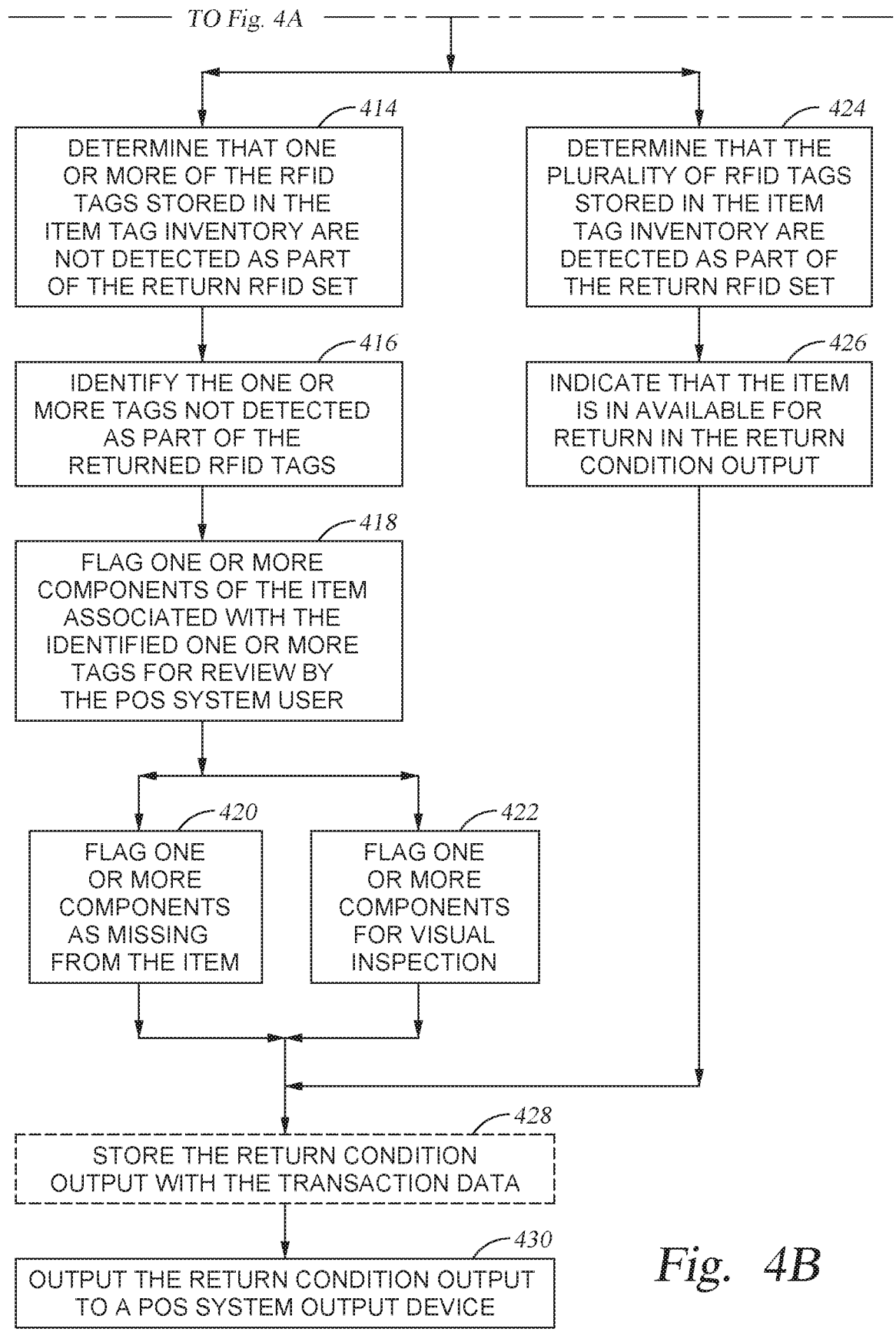

FIGS. 4A-B illustrate a block flow diagram of a method for return fraud prevention, according to one embodiment. Method 400 begins at block 402, where the detection module 211 reads an item, using the antenna 151 associated with the POS system 150, first information from a plurality of initial RFID tags associated with one or more components. In some examples, the POS system 150 reads the first information in response to a detection of an item transaction movement indicating that the item is to be associated with a transaction/buyer. For example, the transaction movement may include detecting when the item is scanned for purchase and/or moved across a barcode scanner at the POS system 150. Furthermore, as described in relation to FIGS. 1 and 3, the POS system 150 reads/detects initial detected tag set 302 for the item 120. In some examples, the antenna 151 functions as a two way radio and interrogates the RFID tags and receives the first information as identification responses from the RFID tags that receive the interrogation signal. In some examples, the initial RFID tags, initial detected tag set 302, are compared to a predetermined expected set of initial tags stored in an item index 222 to verify that all expected RFID tags for an item are detected/read. A missing expected RFID tag may indicate that the item is missing a component or that the RFID tag is not functioning. In some examples, if an expected tag is not detected the POS system 150 stores the initial detected tag set 302 without the missing tag.

In some examples, the plurality of initial RFID tags comprise a plurality of tamper proof RFID tags, where tamper proof RFID tags are rendered undetectable/unreadable by the antenna of the POS system 150 when the tamper proof RFID tag is not present in the item or when the tamper proof RFID tag has been modified/manipulated. In some examples, the RFID tags include a tamper proof RFID tag affixed and/or printed directly to a component of the item, a tamper proof RFID tag affixed and/or printed to a seam of the item, and/or a tamper proof RFID tag integrated into a connecting component of the item. In some examples, the initial detected tags include tags affixed and/or printed to the item and the components of the item at a time of manufacture of the item. For example, a laptop manufacturer applies tamper proof RFID tags to the valuable internal components of the laptop, the laptop itself, and the laptop container in order to provide tracking of the item from manufacture of the item to its sale to a customer. In another example, the tamper proof RFID tags are applied to the item and item components by another entity such as the POS system 150 provider/operator (e.g., a retailer) in order to provide post-manufacture tracking and to prevent return fraud.

At block 404, the return module 212 stores the first information as an item tag inventory for the item, such as item tag inventory 221a, in an item tag inventory database, 221. In some examples, the item tag inventory 221a is stored with unique identifying information that can be read/detected at time of return in order to locate the item tag inventory 221a associated with the item. In some examples, the item tag inventory is stored and tracked independent of other transaction data such as in the transaction database 224. In some examples, the method 400 proceeds to block 406, where the transaction module 213 stores the item tag inventory 221a with transaction data 224a identifying the item and a receiver of the item. For example, such as shown in step 306 in FIG. 3, the item tag inventory is stored with other transaction data for complete transaction tracking.

At block 408, the detection module 211 reads, using the antenna associated with the POS system, second information from one or more return RFID tags associated with the item at a time of item return. In some examples, the antenna 151 interrogates the RFID tags and receives the second information in the response from the RFID tags that receive the interrogation signal. In some examples, the RFID tags that have not been tampered with or removed from the item respond to the interrogation signal from the antenna 151, while the modified/missing RFID tags are not able to return a signal.

At block 410, the return module 212 stores the second information as a return RFID set. In some examples, the return RFID set can be aggregated to determine typical customer return behavior such as returning the item unopened, returning the item without item accessories, returning the item without item components, etc.

At block 412, the return module 212 determines a return condition output for the item based on a comparison of the return RFID set and the stored item tag inventory. In some examples, the return condition output includes one or more textual, visual, and/or audible outputs for a POS system user indicating if the item is in condition to be returned or rejected. For example, as described in step 315, the return tag set 311 and the item tag inventory 221a are compared and it is determined that the tags 132 and 136 are not read/detected in the return tag set 311. In some examples, such as when one or more RFID tags present in the item tag inventory 221a are not read/detected as part of the returned RFID tags, method 400 proceeds to block 414 (see FIG. 4B), where the return module 212 determines from the comparison that one or more of the RFID tags stored in the item tag inventory are not detected as part of the return RFID set.

At block 416, the return module 212 identifies the one or more tags not detected as part of the returned RFID tags. For example, the as shown in FIG. 3, the tags 132 and 136 are not detected in the return tag set 311 and are identified by the POS system 150.

At block 418, the return module 212 flags one or more components of the item associated with the identified one or more tags for review by the POS system user in the return condition output. For example, as shown in block 420 and in the return condition 223a in FIG. 3, the return module 212 flags the component 122 as missing. When the return condition output is provided to the POS user 331 as shown in FIG. 3, the POS user is immediately and easily informed of which component in the item is missing. In another example, as shown in block 422, the return module 212 flags one or more components for visual or follow-up inspection by a POS system user. For example, if an RFID tag associated with a seam 145 of the item 120 and/or seam 140 of item container 110 is not detected, the item may still be eligible for return upon a visual inspection of the seam by the POS user.

Recall block 412 in FIG. 4A, where the return module 212 determines a return condition output for the item based on a comparison of the return RFID set and the stored item tag inventory. In an example where the comparison indicates that all RFID tags are present in both the item tag inventory and the return RFID set, method 400 proceeds to block 424 in FIG. 4B, where the return module 212 determines that the plurality of RFID tags stored in the item tag inventory are detected as part of the return RFID set. At block 426, the return module 212 indicates that the item is in available for return in the return condition output.

In some examples, method 400 then proceeds to block 428, where the transaction module 213 stores the return condition output with the transaction data to provide for tracking of the entire transaction associated with the item 120. At block 430 the return condition output is outputted to a POS output device such as the I/O devices 235 for review by the POS user, such as the POS user 331 shown in FIG. 3, to either reject the item for return or accept the item for return based on the return condition output.

Figure 5:
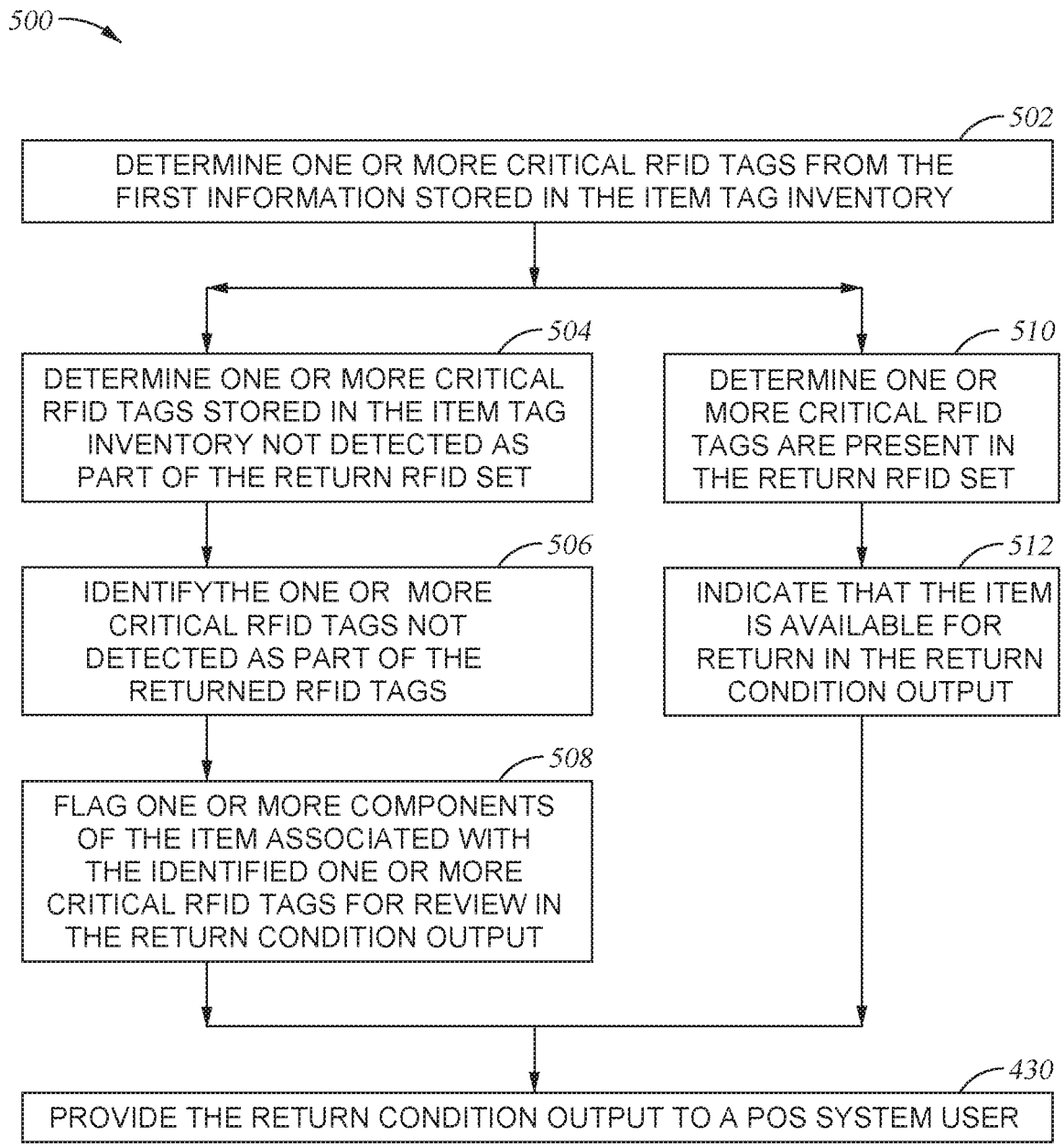
FIG. 5 illustrates a block flow diagram of a method for return fraud prevention using critical identifications, according to one embodiment.

FIG. 5 illustrates a block flow diagram of a method for return fraud prevention using critical identifications, according to one embodiment. In some examples, not all RFID tags associated with the item and stored in the item tag inventory need to be read/detected at the time of return in order for the return to be processed. For example, the RFID tags associated with seam 140 of the item container 110 and/or other components such as the item accessory 124 may be missing from the return RFID set, but the item may still be in condition for return. Method 500 begins at block 502 where the return module 212 determines one or more critical RFID tags from the first information stored in the item tag inventory. In some examples, the return module 212 uses the item index 222 and/or other information associated with the item to determine which tags are critical tags, such as those associated with valuable components of the item.

When one or more of the one or more critical RFID tags stored in the item tag inventory are not detected as part of the return RFID set, method 500 proceeds to block 504 where the return module 212 determines from the comparison that one or more of the critical RFID tags in the first information stored in the item tag inventory are not read/detected as part of the return RFID set. At block 506, the return module identifies, based on the comparison of the return RFID set, the one or more critical RFID tags not read/detected as part of the returned RFID tags. At block 508, the return module 212 flags the one or more components of the item associated with the identified one or more critical RFID tags for review by the POS system user in the return condition output.

In an example, where the one or more critical RFID tags are read/detected as present in the return RFID set, method 500 proceeds to block 510 where the return module 212 determines that the one or more critical RFID tags stored in the item tag inventory are detected as part of the return RFID set. At block 512, the return module 212 indicates that the item is available for return in the return condition output.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., modules 215) or related data available in the cloud. For example, the detection module 211 and return module 212 could execute on a computing system in the cloud and interact with the item tag inventory 221 and other data also stored at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method at a point of sale (POS) system, the method comprising:
   upon detection of an item transaction movement, reading, using an antenna associated with the POS system, first information from a plurality of initial radio-frequency identification (RFID) tags associated with one or more components of an item;
   upon verification that the first information comprises expected RFID tags for the item at a time of purchase, storing the first information as an item tag inventory for the item in an item tag inventory database;

at a time of item return, reading, using the antenna associated with the POS system, second information from one or more return RFID tags associated with the item;

storing the second information as a return RFID set;

determining a return condition output for the item based on a comparison of the return RFID set and the stored item tag inventory; and outputting the return condition output to a POS system output device.

2. The method of claim 1, wherein determining the return condition output for the item based on the comparison of the return RFID set and the stored item tag inventory further comprises:

determining from the comparison that one or more of the RFID tags stored in the item tag inventory are not detected as part of the return RFID set;

identifying the one or more tags not detected as part of the returned RFID tags; and flagging one or more components of the item associated with the identified one or more tags for review in the return condition output.

3. The method of claim 2, wherein the plurality of initial RFID tags comprise a plurality of tamper proof RFID tags, wherein a tamper proof RFID tag of the plurality of RFID tags is rendered undetectable by the antenna of the POS system at least when the tamper proof RFID tag is not present in the item or when the tamper proof RFID tag has been modified, and wherein the plurality of RFID tags comprise one or more of:

a tamper proof RFID tag affixed directly to a component of the item;

a tamper proof RFID tag affixed to a seam of the item; and a tamper proof RFID tag integrated into a connecting component of the item.

4. The method of claim 3, wherein the plurality of tamper proof tags comprises one or more of:

a tamper proof tag affixed by an item manufacturer; and a tamper proof RFID tag affixed by a POS system provider.

5. The method of claim 2, wherein flagging one or more components of the item associated with the identified one or more tags for review in the return condition output further comprises one or more of:

flagging one or more components as missing from the item; and flagging one or more components for visual inspection.

6. The method of claim 1, wherein determining the return condition output for the item based on the comparison of the return RFID set and the stored item tag inventory further comprises:

determining one or more critical RFID tags from the first information stored in the item tag inventory;

when one or more of the one or more critical RFID tags are not detected as part of the return RFID set:

identifying the one or more critical RFID tags not detected as part of the returned RFID tags; and flagging one or more components of the item associated with the identified one or more critical RFID tags for review in the return condition output; and when the one or more critical RFID tags are detected as present in the return RFID set:

indicating that the item is in available for return in the return condition output.

7. The method of claim 1, further comprising:

storing the item tag inventory with transaction data identifying the item and a receiver of the item; and storing the return condition output with the transaction data.

8. A point of sale (POS) system comprising:

one or more computer processors;

an antenna configured to detect radio-frequency identification (RFID) tags; and a memory containing program code which, when executed by the one or more computer processors, performs an operation comprising:

upon detection of an item transaction movement, reading, using the antenna, first information from a plurality of initial radio-frequency identification (RFID) tags associated with one or more components of an item;

upon verification that the first information comprises expected RFID tags for the item at a time of purchase, storing the first information as an item tag inventory for the item in an item tag inventory database;

at a time of item return, reading, using the antenna, second information from one or more return RFID tags associated with the item;

storing the second information as a return RFID set;

determining a return condition output for the item based on a comparison of the return RFID set and the stored item tag inventory; and outputting the return condition output to a POS system output device.

9. The system of claim 8, wherein determining the return condition output for the item based on the comparison of the return RFID set and the stored item tag inventory further comprises:

determining from the comparison that one or more of the RFID tags stored in the item tag inventory are not detected as part of the return RFID set;

identifying the one or more tags not detected as part of the returned RFID tags; and flagging one or more components of the item associated with the identified one or more tags for review in the return condition output.

10. The system of claim 9, wherein the plurality of initial RFID tags comprise a plurality of tamper proof RFID tags, wherein a tamper proof RFID tag of the plurality of RFID tags is rendered undetectable by the antenna of the POS system at least when the tamper proof RFID tag is not present in the item or when the tamper proof RFID tag has been modified, and wherein the plurality of RFID tags comprise one or more of:

a tamper proof RFID tag affixed directly to a component of the item;

a tamper proof RFID tag affixed to a seam of the item; and a tamper proof RFID tag integrated into a connecting component of the item.

11. The system of claim 10, wherein the plurality of tamper proof tags comprises one or more of:

a tamper proof tag affixed by an item manufacturer; and a tamper proof RFID tag affixed by a POS system provider.

12. The system of claim 9, wherein flagging one or more components of the item associated with the identified one or more tags for review in the return condition output further comprises one or more of:

flagging one or more components as missing from the item; and flagging one or more components for visual inspection.

13. The system of claim 8, wherein determining the return condition output for the item based on the comparison of the return RFID set and the stored item tag inventory further comprises:
- determining one or more critical RFID tags from the first information stored in the item tag inventory;
- when one or more of the one or more critical RFID tags are not detected as part of the return RFID set:
  - identifying the one or more critical RFID tags not detected as part of the returned RFID tags; and
  - flagging one or more components of the item associated with the identified one or more critical RFID tags for review in the return condition output; and
- when the one or more critical RFID tags are detected as present in the return RFID set:
  - indicating that the item is in available for return in the return condition output.

14. The system of claim 8, wherein the operation further comprises:
- storing the item tag inventory with transaction data identifying the item and a receiver of the item; and
- storing the return condition output with the transaction data.

15. A computer program product for a point of sale (POS) system, the computer program product comprising:
- a computer-readable storage medium having computer-readable program code embodied therewith, the computer-readable program code executable by one or more computer processors to perform an operation comprising:
  - upon detection of an item transaction movement, reading, using an antenna associated with the POS system, first information from a plurality of initial radio-frequency identification (RFID) tags associated with one or more components of an item;
  - upon verification that the first information comprises expected RFID tags for the item at a time of purchase, storing the first information as an item tag inventory for the item in an item tag inventory database;
  - at a time of item return, reading, using the antenna associated with the POS system, second information from one or more return RFID tags associated with the item;
  - storing the second information as a return RFID set;
  - determining a return condition output for the item based on a comparison of the return RFID set and the stored item tag inventory; and
  - outputting the return condition output to a POS system output device.

16. The computer program product of claim 15, wherein determining the return condition output for the item based on the comparison of the return RFID set and the stored item tag inventory further comprises:
- determining from the comparison that one or more of the RFID tags stored in the item tag inventory are not detected as part of the return RFID set;
- identifying the one or more tags not detected as part of the returned RFID tags; and
- flagging one or more components of the item associated with the identified one or more tags for review in the return condition output.

17. The computer program product of claim 16, wherein the plurality of initial RFID tags comprise a plurality of tamper proof RFID tags, wherein a tamper proof RFID tag of the plurality of RFID tags is rendered undetectable by the antenna of the POS system at least when the tamper proof RFID tag is not present in the item or when the tamper proof RFID tag has been modified, and wherein the plurality of RFID tags comprise one or more of:
- a tamper proof RFID tag affixed directly to a component of the item;
- a tamper proof RFID tag affixed to a seam of the item; and
- a tamper proof RFID tag integrated into a connecting component of the item.

18. The computer program product of claim 16, wherein flagging one or more components of the item associated with the identified one or more tags for review in the return condition output further comprises one or more of:
- flagging one or more components as missing from the item; and
- flagging one or more components for visual inspection.

19. The computer program product of claim 16, wherein determining the return condition output for the item based on the comparison of the return RFID set and the stored item tag inventory further comprises:
- determining one or more critical RFID tags from the first information stored in the item tag inventory;
- when one or more of the one or more critical RFID tags are not detected as part of the return RFID set:
  - identifying the one or more critical RFID tags not detected as part of the returned RFID tags; and
  - flagging one or more components of the item associated with the identified one or more critical RFID tags for review in the return condition output; and
- when the one or more critical RFID tags are detected as present in the return RFID set:
  - indicating that the item is in available for return in the return condition output.

20. The computer program product of claim 16, wherein the operation further comprises:
- storing the item tag inventory with transaction data identifying the item and a receiver of the item; and
- storing the return condition output with the transaction data.

\* \* \* \* \*